(12) United States Patent
Landler et al.

(10) Patent No.: US 12,473,154 B2
(45) Date of Patent: Nov. 18, 2025

(54) DEVICE FOR TRANSPORTING CONTAINERS WITH SPACING ADAPTATION

(71) Applicant: KRONES AG, Neutraubling (DE)

(72) Inventors: Bruno Landler, Neutraubling (DE); Markus Schoenfelder, Neutraubling (DE)

(73) Assignee: KRONES AG, Neutraubling (DE)

( * ) Notice: Subject to any disclaimer, the term of this patent is extended or adjusted under 35 U.S.C. 154(b) by 99 days.

(21) Appl. No.: 18/443,219

(22) Filed: Feb. 15, 2024

(65) Prior Publication Data

US 2024/0279001 A1 Aug. 22, 2024

(30) Foreign Application Priority Data

Feb. 16, 2023 (DE) ..................... 10 2023 103 858.3

(51) Int. Cl.
*B65G 47/84* (2006.01)
*B65G 47/28* (2006.01)
(Continued)

(52) U.S. Cl.
CPC .......... *B65G 47/28* (2013.01); *B65G 47/841* (2013.01); *B67C 7/0013* (2013.01); *B67C 7/0026* (2013.01)

(58) Field of Classification Search
CPC ........ B65G 17/02; B65G 17/38; B65G 17/40; B65G 17/42; B65G 47/842; B65G 47/28;
(Continued)

(56) References Cited

U.S. PATENT DOCUMENTS 2,621,841 A 12/1952 Simpson
3,292,769 A * 12/1966 Zuppiger ............... B65G 23/30
198/792

(Continued)

FOREIGN PATENT DOCUMENTS

CH 690006 3/2000
DE 20 2004 006 716 9/2005
(Continued)

OTHER PUBLICATIONS

Search Report Issued on Nov. 23, 2023 by the German Patent Office in priority application No. DE 10 2023 103 858.3, 5 pages.
(Continued)

*Primary Examiner* — Gene O Crawford
*Assistant Examiner* — Muhammad Awais
(74) *Attorney, Agent, or Firm* — Haynes and Boone, LLP

(57) ABSTRACT

A device for transporting containers along a transport path having: a base chain with a plurality of chain links lined up in a row along the transport path and connected to one another in a correspondingly pivotable manner via chain joints, wherein the chain links are at least partly displaceable relative to one another in the direction of the transport path, so that the distance between adjacent chain joints is at least to some extent variable; a plurality of container carriers provided on at least some of the chain links and configured to receive a respective container and carry it along the transport path; a chain track configured to guide the base chain along the transport path; and a toggle lever mechanism attached to the base chain and configured to effect the displacement of the chain links relative to one another in cooperation with the chain track.

20 Claims, 5 Drawing Sheets

(51) Int. Cl.
    *B67C 3/24* (2006.01)
    *B67C 7/00* (2006.01)
(58) Field of Classification Search
    CPC .......... B65G 47/841; B65G 2201/0235; B65G 2201/0244; B65G 2201/0252; B65G 2201/0255; B67C 7/0013; B67C 7/0026; B67C 7/0053; B67C 3/24
    USPC .................. 198/850, 851, 852, 853, 434
    See application file for complete search history.

(56) References Cited

U.S. PATENT DOCUMENTS

| | | | | |
|---|---|---|---|---|
| 3,294,215 | A | * | 12/1966 | Walter ............... B65G 17/323 198/837 |
| 4,227,606 | A | * | 10/1980 | Bogatzki ............. B65G 47/28 198/459.8 |
| 5,692,594 | A | * | 12/1997 | Sidler ............... B65G 47/841 198/732 |

FOREIGN PATENT DOCUMENTS

| | | | |
|---|---|---|---|
| DE | 10 2013 112 091 | 5/2015 | |
| DE | 10 2020 131 105 | 5/2022 | |
| EP | 1 118 564 | 7/2001 | |
| EP | 1118564 A1 * | 7/2001 | .......... B65G 19/025 |
| EP | 1232969 | 8/2002 | |
| EP | 1232969 A1 * | 8/2002 | ............ B65G 47/28 |
| EP | 2 980 010 | 2/2016 | |
| JP | 2556325 | 12/1997 | |
| WO | 2019057304 | 1/2019 | |
| WO | WO 2019048549 | 3/2019 | |
| WO | WO-2019048549 A1 * | 3/2019 | ............ B65G 47/28 |
| WO | WO-2019057304 A1 * | 3/2019 | .......... B65G 47/841 |

OTHER PUBLICATIONS

Extended European Search Report dated Jul. 4, 2024, from European Application No. 24158032.3, 5 pages.

* cited by examiner

DEVICE FOR TRANSPORTING CONTAINERS WITH SPACING ADAPTATION

CROSS-REFERENCE TO RELATED APPLICATIONS

This application claims priority from German Patent Application No. DE 10 2023 103 858.3, filed on Feb. 16, 2023 in the German Patent and Trademark Office, the disclosure of which is incorporated herein by reference in its entirety.

BACKGROUND

Technical Field

The present invention relates to a device for transporting containers along a transport path, for example in a beverage filling system, and a device for transporting and handling containers, in particular for filling the containers with a filling product and closing each of the containers with a closure.

Related Art

In the field of beverage filling systems, it is known to fill containers with a filling product in a filler and then to transfer them by means of a transfer device to a closer, which applies a closure to each of the containers. Here, devices of a rotary-type are normally used as fillers and closers, in which the containers are transported along a circular trajectory by means of a carousel during the handling.

The transport to and away from a rotary-type devices can be carried out via transport star wheels, which likewise transport the containers on a circular path, or a linear transfer apparatus, comprising, for example, transport belts, transport chains and so on. A linear transfer apparatus, comprising a transport member similar to a band having holding clamps for holding the containers to be transported, can be gathered from DE 10 2020 131 105 A1.

During the transport of the containers from one station to the next, for example during transfer from the filler to the closer, it is possible that the spacing of the containers, i.e. the distance between adjacent containers, may change. This can lead to spilling or damage to the containers during the transfer of the containers, for example into and out of a transport chain.

In order to produce or to improve the compatibility between individual stations, spacing converters are known, which are configured to change the spacing of the containers during transport between stations with a different spacing. A spacing converter of rotary-type device having transfer star wheels arranged one above another can be gathered from DE 20 2004 006 716 U1. A spacing converter based on a scissor chain having a plurality of receiving elements for receiving and carrying the containers is known from WO 2019/057304 A1.

Spacing converters are generally more mechanically complicated than corresponding transport systems with constant spacing. This can lead to impairment of the smooth running and to susceptibility to faults, and therefore increase the effort on maintenance. There is a mechanical challenge in providing a robust, low-fault mechanism in conjunction with increased smooth running, in order to avoid spilling and damage to containers.

SUMMARY

An improved device for transporting containers along a transport path, for example in a beverage filling system, and an improved device for transporting and handling containers, in particular in increasing the reliability and/or smooth running of such a device, are described herein according to various embodiments.

The device according to the invention, also designated as a "transport device" herein, is used to transport containers along a transport path, in particular to transfer the containers from one station, for example a filling device, to another station, for example a closing device. The transport path is in several embodiments substantially linear. The transport device is in one embodiment used in conjunction with one or more rotary-type devices. In other words, the containers are in certain embodiments transferred from a device or station to the transport device by using a curved, for example circular, transport trajectory; alternatively or additionally, the containers are transferred from the transport device to a device or station by using a curved, for example circular, transport trajectory.

The transport device according to the invention is in some embodiments used in a beverage filling system, thus for example for filling with water (still or carbonated), soft drinks, beer, wine, juice, smoothies, milk products, mixed beverages and the like.

The transport device has a base chain having a plurality of chain links, which are lined up in a row along the transport path and connected to one another via chain joints so as to be appropriately pivotable. The chain links according to the invention can be displaced relative to one another at least partly in the direction of the transport path, so that the distance between adjacent chain links or chain joints is at least to some extent variable.

The transport device has a plurality of container carriers, which are provided on at least some of the chain links and are configured to receive a respective container and carry it along the transport path.

The transport device further has a chain track, which is configured to guide the base chain along the transport path, and a toggle lever mechanism, which is attached to the base chain and is configured to effect the displacement of the chain links relative to one another in cooperation with the chain track.

"Spacing" is intended to designate the distance between adjacent containers involved in the transport. The transport device according to the invention is capable of varying the spacing between adjacent containers during the transport along the transport path, and thus functions as a spacing converter.

The transport device is mechanically robust as a result of the provision and nature of the base chain, which forms a stable, quiet-running base for the toggle lever mechanism. Durability, resistance and reliability are improved. This is equally true of the hygiene and ability to be cleaned, which are imperative in particular in the food processing sector.

In one or more embodiments, the base chain has transport rollers or sliding surfaces, which are configured to roll or to slide on the chain track and thus to guide the base chain along the transport path. In this way, firstly the smooth running of the chain is improved further, secondly as a result of the stabilization of the base chain, the toggle lever mechanism does not tend to snag or tilt; the chain joints or their shafts are able to function synergistically as shafts for the transport rollers.

In many embodiments, the relative displaceability of the chain links of the base chain is achieved by the chain links each to some extent having a slot, in which a corresponding chain joint for the articulated connection to an adjacent chain link is displaceably mounted. The chain links equipped with a slot function as pulling levers for relieving the load on the chain. The slots prevent the chain being "pulled smooth." In other words, the whole of the chain, comprising the base chain and the toggle lever mechanism, is stabilized by the base chain as a circulating base itself.

For a practical, mechanically simple and robust implementation of this concept, the base chain in some embodiments has two types of chain links, namely strain relief links and carrier links. The strain relief links and carrier links are lined up alternately in a row via the corresponding chain joints, the carrier links each having a container carrier, and the strain relief links each having a slot, in which a corresponding chain joint for the articulated connection to an adjacent carrier link is displaceably mounted.

In one or more embodiments, the toggle lever mechanism has a plurality of toggle lever assemblies each having two spacing levers, wherein the two spacing levers are each pivotably connected to one another in an end section via a spacer lever joint and are correspondingly pivotably installed on the base chain in the other end sections, in one embodiment synergistically on corresponding chain joints. In this way, the spreading of the toggle lever mechanism directly determines the relative displacement of the chain links and thus the spacing of the containers to be transported.

In certain embodiments, a spacing roller which rolls on the chain track is installed on the spacing lever joint, as a result of which the shape of the chain track determines the spreading of the toggle lever mechanism and thus the displacement of the chain links relative to one another. The toggle lever mechanism constructed in this way, in cooperation with the base chain, makes it possible that the chain does not have to be guided or at least not exclusively guided in the chain running direction by the spacing rollers when it is in the stretched state, so that the chain does not tend to snag or tilt.

In several embodiments, the chain track comprises a lower running contour, which in some embodiments extends rectilinearly, and an upper running contour, wherein the transport rollers or sliding surfaces are configured to roll or to slide against or on the lower running contour, wherein the spacing rollers are configured to roll against or on the upper running contour. In this way, the chain track functions both as a general guide for the base chain and also as a track for determining the spacing.

The spatial designations "above", "below" and so on relate to the intended use and installation position of the transport device. As a rule, they are to be viewed relative to the direction of the force of gravity.

In certain embodiments, the transport device further has at least two rotatable deflection wheels, around which the base chain is laid as a closed chain and which are configured to cause the base chain to circulate, as a result of which the base chain is transported along the transport path. At least one of the deflection wheels is in various embodiments driven via a drive, for example an electric motor. The circumference of the deflection wheels is configured in such a way that they cooperate with the base chain, in some embodiments engage locally or point-by-point in the latter, so that the torque produced by the drive is transferred to the base chain. The deflection wheels are in one or more embodiments formed in the manner of gears for this purpose, the teeth of the deflection wheels engaging in corresponding recesses in the base chain.

The base chain made of chain links lined up in a row forms a chain strand, the device in several embodiments having two chain strands of this type, which run parallel to each other and at a distance from each other, as a result of which the chain is further stabilized. In various embodiments, the transport rollers or sliding surfaces are arranged between the two chain strands. The toggle lever mechanism is in one embodiment attached to only one of the two chain strands.

A device for transporting and handling containers, for example in a beverage filling system, wherein the device comprises one or more handling devices for handling the containers in addition to the transport device according to one of the previously presented design variants is also described herein according to various embodiments.

The features, technical effects, advantages and exemplary embodiments which have been described with reference to the transport device apply analogously to the device for transporting and handling the containers.

In one or more embodiments, the device has, as handling devices, a filling device for filling the containers with a filling product and a closing device for closing each of the containers filled with the filling product with a closure, wherein the transport device is configured to transport the containers filled with the filling product from the filling device to the closing device.

In some embodiments, the filling device and the closing device handle the containers with a different spacing or have a different spacing. In this case, the transport device is configured to accept the containers from the filling device with a first spacing, to move them to a second spacing suitable for the closing device during the transport to the closing device, and to transfer them to the closing device. The spacing of the filling device is in certain embodiments smaller than that of the closing device.

For the practical implementation of this spacing conversion, the chain track of the transport device in various embodiments provides (at least) three zones of the chain spacing, namely a first zone which is configured to move the base chain to the spacing required for receiving the containers from the filling device, wherein the distance between the chain links in the first zone (during the transport in the chain running direction) is in one embodiment reduced, a second zone, in which the transfer of the containers from the filling device to the transport device takes place, and a third zone, which is configured to adapt the spacing of the containers appropriately for the closing device, wherein the distance between the chain links is in certain embodiments enlarged in the third zone (during the transport in the chain running direction). In this case, the chain track thus has the form of a ramp with, for example, an increasing thickness to a desired chain lift in the first zone, a constant thickness in the second zone, and a decreasing thickness in the third zone, viewed in the chain running direction along the transport path.

In one or more embodiments, the filling device has a rotary-type device, which is configured to transport the containers along a curved, for example circular, trajectory during the filling. Alternatively or additionally, the closing device has a rotary-type device, which is configured to transport the containers along a curved, for example circular, trajectory during the closing.

The designation "rotary-type device" is generally understood herein as a device, a part of a system or the like which moves one or more containers on a curved, for example circular, trajectory. In the case of a circular trajectory, transport along a circular segment, i.e. along part of a circle, is sufficient. A complete revolution about a full circle is therefore not required. The rotary-type device can be used on its own to transport the containers, in this case also designated as a "transport star wheel", "input star wheel" or "output star wheel", or have handling members such as filling members and/or closing members for the appropriate handling of the containers during the transport. The rotary-type device can be implemented by means of a carousel, a circulating belt or the like, it can have the form of a wheel, a roller, a disc, a star wheel or the like and defines an axial direction by means of its axis of rotation.

The transport device and the device for transporting and handling containers are in particular suitable for handling cans, comprising lightweight cans with a thin can wall. However, other container types are also considered, such as bottles (glass or PET), cartons and the like.

Further features and advantages of the present invention can be seen from the following description of exemplary embodiments. The features described therein can be implemented on their own or in combination with one or more of the features presented above, if the features are not contradictory. The following description of exemplary embodiments is carried out with reference to the appended drawings.

BRIEF DESCRIPTION OF THE FIGURES

Further embodiments of the invention are explained in more detail by means of the following description of the figures.

DETAILED DESCRIPTION

In the following, exemplary embodiments are described with reference to the figures. The same, similar or identical elements are provided with the same reference symbols in the figures, and a repeated description of these elements is to some extent omitted in order to avoid redundancy.

Figure 1:
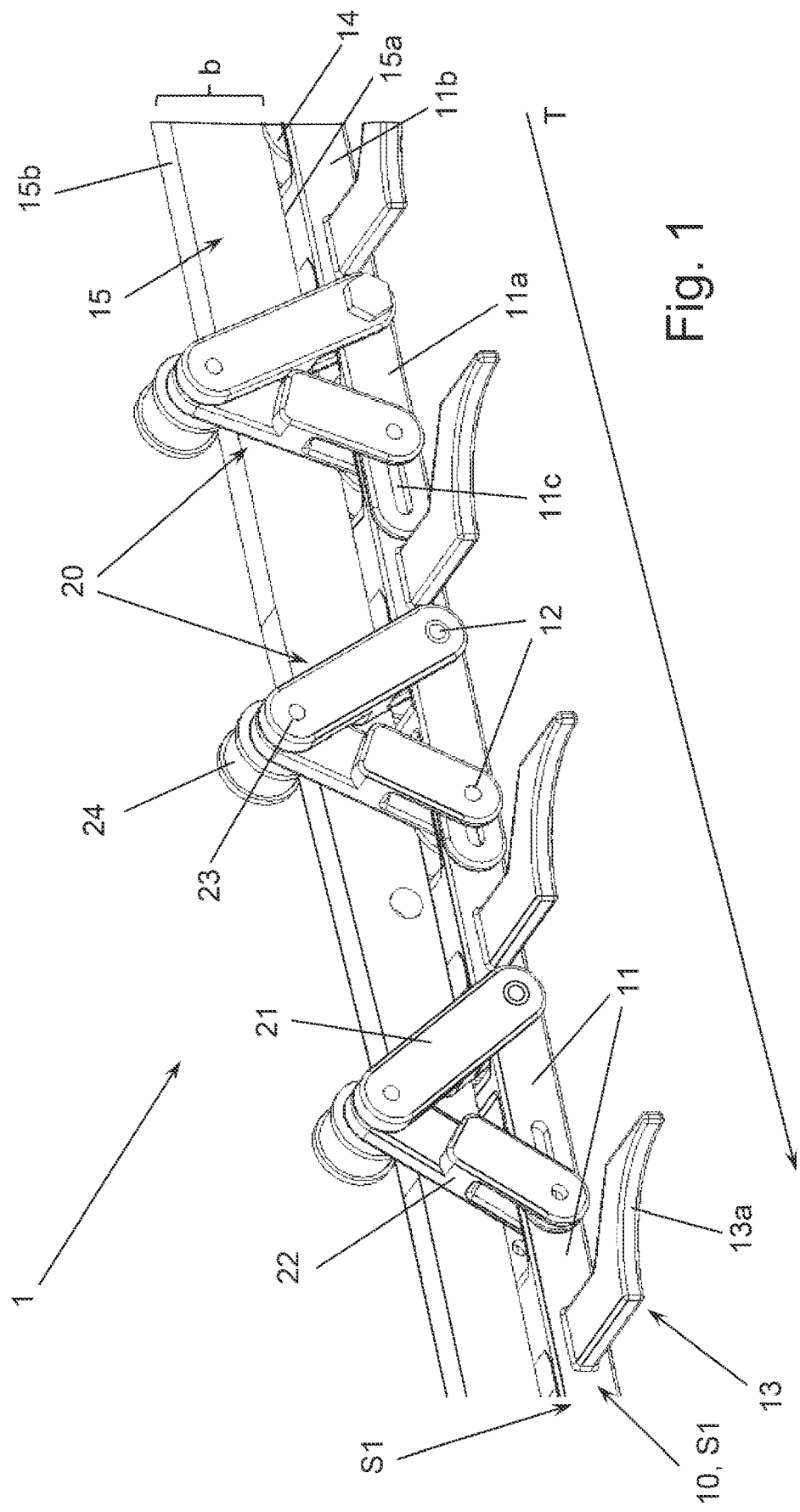
FIG. 1 shows a perspective detail of a device for transporting containers with a spacing conversion function according to an exemplary embodiment.

FIG. 1 shows a perspective detail of a device 1 for transporting containers (not shown in the figures) along a transport path T, which in some embodiments is or at least partly comprises a linear trajectory. The device 1, also designated as a "transport device" herein, is capable of varying the spacing between adjacent containers during the transport along the transport path T and to this extent functions as a spacing converter.

The transport device 1 is in various embodiments used in a beverage filling system, for example for filling with water (still or carbonated), beer, wine, juice, soft drinks, smoothies, milk products, mixed products and the like. In one or more embodiments, the transport device 1 is configured to transport cans. However, other container types are also considered, such as bottles (glass or PET), cartons and the like.

Figure 4:
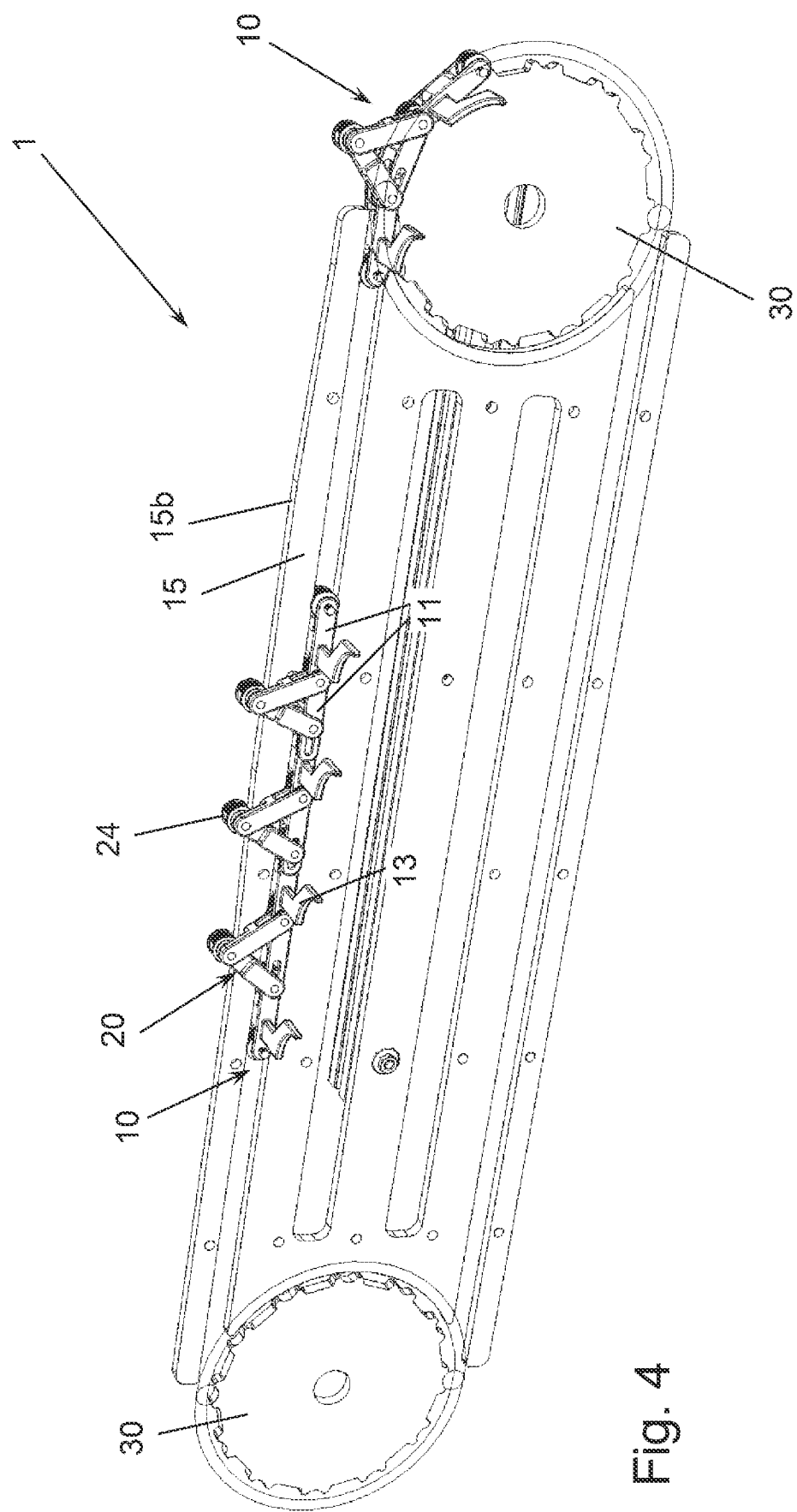
FIG. 4 shows a larger detail of the transport device according to FIG. 1.
Figure 5:
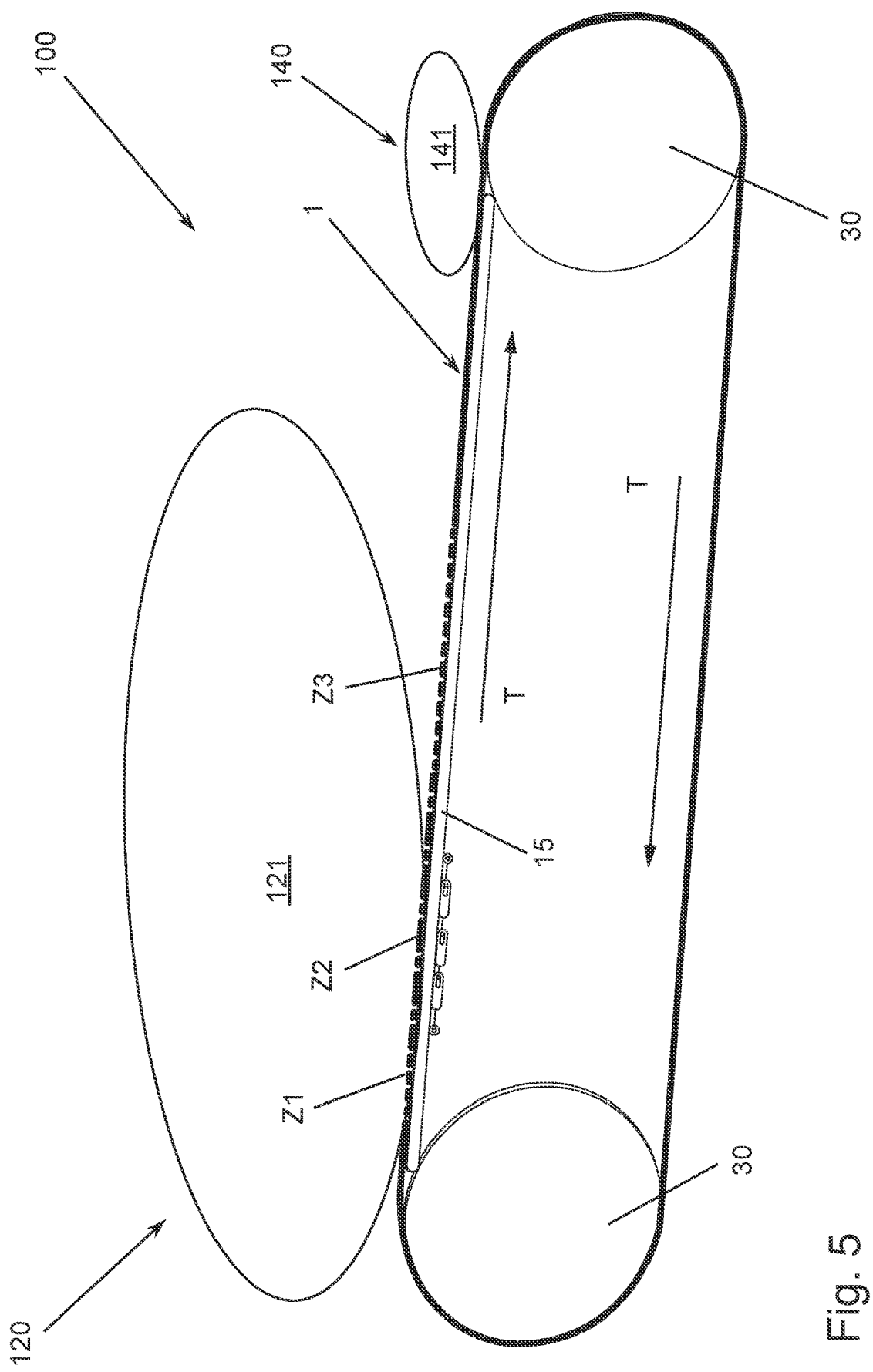
FIG. 5 shows, schematically, a device for transporting and handling containers, in particular for filling and closing containers.

The transport device 1 comprises a base chain 10, which is in certain embodiments configured to circulate as an endless chain, i.e. a closed or annular chain (cf. FIGS. 4 and 5). The base chain 10 comprises a plurality of chain links 11, which are lined up in a row along the transport path T and are linked to one another via chain joints 12 so as to be appropriately pivotable. Furthermore, the chain links 11 are at least partly displaceable relative to one another in the direction of the transport path T, so that the distance between adjacent chain links 12 is at least partly variable. Such a structure made of chain links 11 lined up in a row is also designated herein as a chain strand S1, S2.

A base chain 10 constructed in this way serves as a mechanically robust and reliable base for a toggle lever mechanism 20 described further below which, in cooperation with a chain track 15, determines the displacement of the chain links 11 relative to one another.

Installed on at least some of the chain links 11 are container carriers 13, which are configured to carry a respective container in the chain running direction, i.e. along the transport path T. The container carriers 13 are in the simplest case elements projecting horizontally from the base chain and substantially perpendicular to the transport path, in order to push the containers in the transport direction. The container carriers 13 can have a suitable shape, for example comprise a concave contour 13a which corresponds to the containers 13 to be transported. Alternatively, the container carriers 13 can be implemented as container clamps or another suitable holder or receiver for the containers, provided that they ensure secure and reliable transport of the containers along the transport path T.

The base chain 10 in some embodiments has transport rollers or sliding elements 14, which are configured to guide the base chain 10 securely and in a defined manner along the transport path T and to transport it with little friction. For this purpose, the transport rollers or sliding surfaces 14 are in contact with a corresponding chain track 15 and roll or slide on the latter.

The base chain 10 according to the exemplary embodiment of FIG. 1 comprises two different types of chain links 11, designated herein as a strain relief link 11a and a carrier link 11b. The strain relief links 11a and carrier links 11b are lined up alternately in a row via the corresponding chain joints 12. The carrier links 11b, which each have a container carrier 13, comprise at their longitudinal ends a respective opening to receive a pin or a shaft which forms a corresponding chain joint 12. The strain relief links 11a likewise comprise at their longitudinal ends a respective opening to receive a pin or shaft for connection to a corresponding carrier element 11b, one of the two openings being formed as a slot 11c, as a result of which the strain relief and carrier links 11a,11b that are connected to one another via the slot 11c are displaceable relative to one another, viewed along the chain running direction or the transport path T. The aforementioned pins or shafts for forming the chain joints 12 can function synergistically as shafts for the transport rollers 14.

Figure 2:
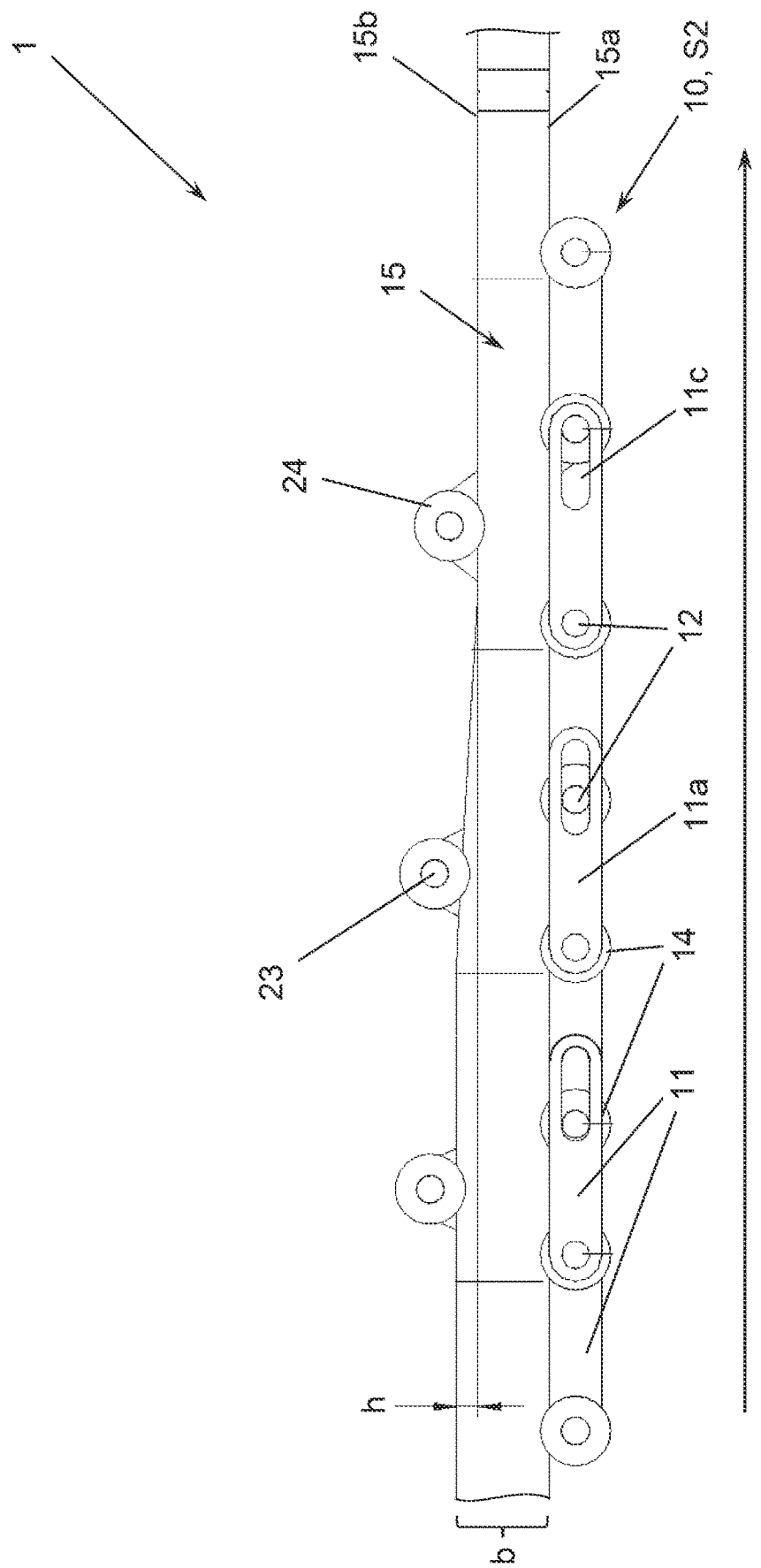
FIG. 2 shows a rear view of the transport device according to FIG. 1.
Figure 3:
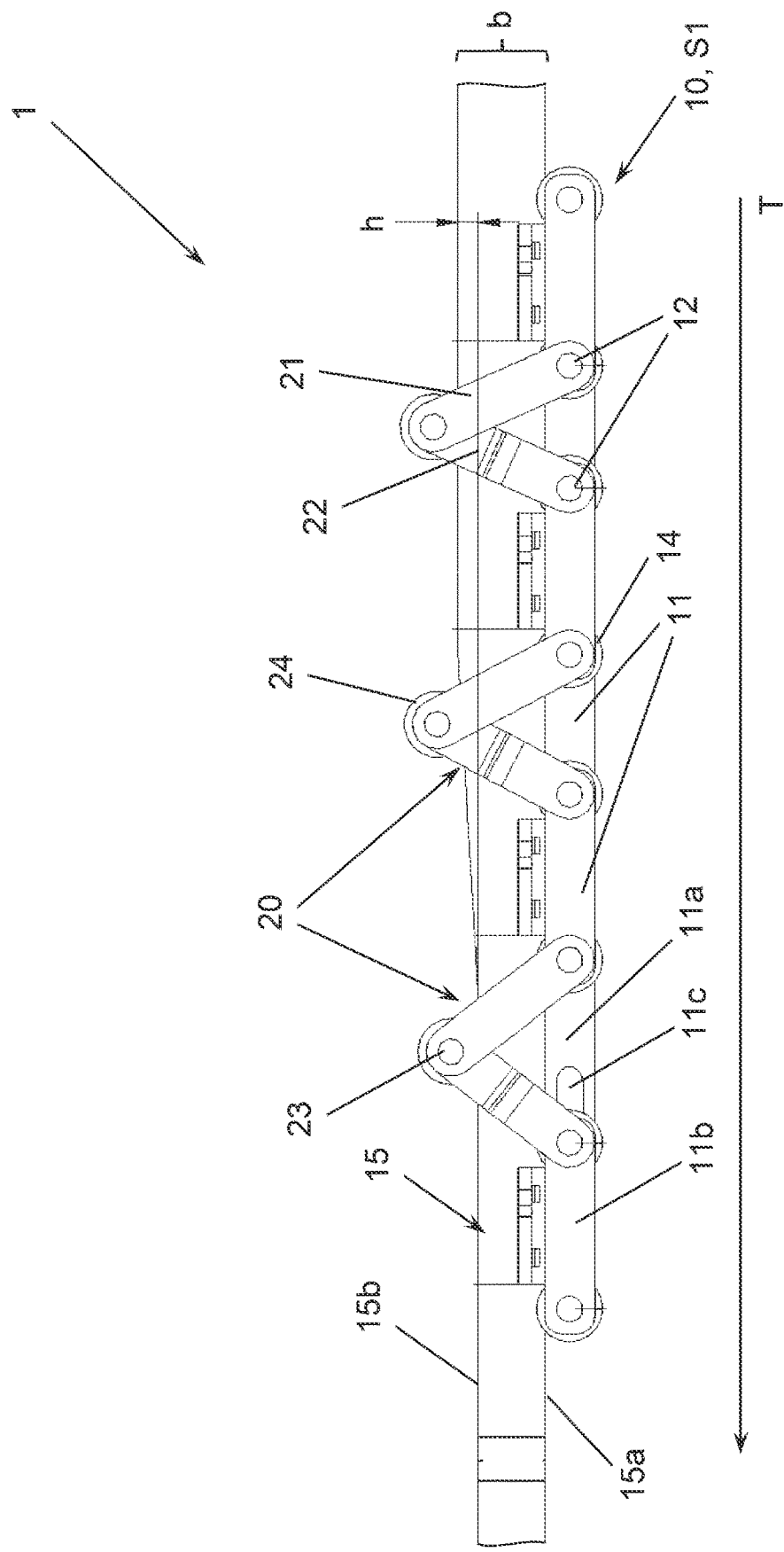
FIG. 3 shows a front view of the transport device according to FIG. 1.

According to the exemplary embodiment of FIG. 1, the above-described chain strand S1, S2 made of strain relief and carrier links 11a, 11b is provided twice in a parallel arrangement, as emerges from a comparison of the chain rear view according to FIG. 2 and the chain front view according to FIG. 3. The two chain strands S1, S2 run parallel to each other at a certain distance, the transport rollers or sliding surfaces 14 being arranged between the chain strands S1, S2.

The displacement of the chain links 11 relative to one another is determined via a toggle lever mechanism 20 in cooperation with the chain track 15. The toggle lever mechanism 20 comprises a plurality of toggle lever assemblies each having two spacing levers 21, 22, which are pivotably connected to each other in an end section via a spacing lever joint 23. In the other end sections, the two spacing levers 21, 22 are pivotably mounted on the base chain 10, for example synergistically on the chain joints 12.

Installed on the spacing lever joint 23 is a running roller, designated as a spacing roller 24 herein. The spacing roller 24 rolls on the chain track 15, as a result of which the shape of the chain track 15 determines the spreading of the toggle lever mechanism 20 and thus the displacement of the chain links 11 relative to one another. For this purpose, in practical terms the chain track 15 in some embodiments comprises a rectilinearly extending lower running contour 15a, on which the transport rollers or sliding surfaces 14 of the base chain 10 roll or slide, and an upper running contour 15b, on which the spacing rollers 24 of the toggle lever mechanism 20 roll.

In the exemplary embodiment of FIGS. 1 to 3, the strain relief links 11a function as pulling levers to relieve the load on the chain. The slots 11c of the strain relief links 11a prevent the chain being "pulled smooth". In other words, the chain is stabilized by the base chain 10 as a circulating base itself, i.e. when stretched the chain does not have to be guided in the chain running direction by the spacing rollers, so that the chain does not tend to snag or tilt.

The spreading of the toggle lever mechanism 20 depends on the width b of the chain track 15, which changes along the transport path T. In the detail of FIGS. 1 to 3, the chain track 15 embodies a ramp, for example, which moves the spacing rollers 24 or the toggle lever arrangements from a vertical state, stretched by a chain lift h, into a normal state b-h.

FIG. 4 shows a larger detail of the transport device 1, comprising, in addition to the base chain 10 (partially illustrated), two rotatable deflection wheels 30, which move and guide the base chain 10 to circulate as a closed chain or endless chain. At least one of the deflection wheels 30 is driven and set rotating via a drive, not illustrated, for example an electric motor. The circumference of the deflection wheels 30 is configured such that they cooperate with the base chain 10, in some embodiments engage locally in the latter, so that the torque produced by the drive is transmitted to the base chain 10. The deflection wheels 30 can be configured, for example, in the form of gearwheels, the teeth of the deflection wheels 30 engaging in corresponding recesses in the base chain 10.

FIG. 5 shows, schematically, a device 100 for transporting and handling containers, in practical terms for filling and closing containers, comprising a filling device 120 and a closing device 140 in addition to the transport device 1. The filling device 120 and the closing device 140 are implemented as rotary-type devices, each comprising an appropriate handling carousel.

Via an inlet, not illustrated in FIG. 5, the containers to be filled are transferred to a rotary-type device 121 of the filling device 120. The rotary-type device 121 can rotate about an axis of rotation. On its circumference, the rotary-type device 121 comprises a plurality of time-controlled filling members, not shown in FIG. 5, which are configured to fill the containers with a filling product, for example a beverage such as water (still or carbonated), soft drinks, beer, wine, juice, milk products and so on.

The filling of the containers can take up substantially the entire circumference of the rotary-type device 121 apart from a small angular segment, which is also designated as a "filler dead angle", before, after the filling, the containers are transferred to the transport device 1, which is used as a filler outlet and to transfer the containers to the closing device 140.

The containers are transferred to the transport device 1 with a first spacing, wherein, in addition to the transport and the transfer of the containers to the closing device 140, the transport device 1 has the task of moving the containers to the spacing required for the closing device 140.

The closing device 140 likewise comprises a rotary-type device 141 which, on its circumference, has a plurality of closing members, not illustrated in FIG. 5, which are configured to close the filled containers with a closure each, for example a screw top, cork or crown cork. In the case of a can closer, the closing device 140 is configured to apply appropriate can covers to the cans.

In FIG. 5, three zones of the chain spacing Z1, Z2, Z3 of the transport device 1 are shown by way of example. In the first zone Z1, the base chain 10 is moved to the spacing required to receive the containers from the filling device 120. If the filling device 120 has a smaller spacing (for example 87 mm) than the closing device (for example 105 mm), the chain links 11 experience a negative acceleration in the first zone Z1, i.e. the distance between the chain links 11 is reduced and the spreading of the toggle lever assemblies decreases. In the second zone Z2, which corresponds to the ramp with chain lift h shown in FIGS. 2 and 3, the transfer of the containers from the filling device 122 to the transport device 1 takes place. In the third zone Z3, the spacing of the containers is adapted appropriately for the closing device 140. In the aforementioned case, in which the spacing for the closing device 140 is increased, the chain links 11 experience a positive acceleration.

Since the device 1 permits spacing adaptation, the compatibility of handling devices with different spacings can be improved. In particular, the handling devices can be run with different outputs. Thus, in regular operation the filling device 120 can be run for example with a lower circumferential speed (for example 2.42 m/s) than the closing device 140 (for example 2.92 m/s), without this leading to problems during the transfer of the containers.

The adaptation of the spacing is carried out continuously and can be regulated precisely, depending on the nature of the chain track 15, so that a gentle transition of the spacing is possible and a more secure, quiet container run is implemented. Any spilling and any damage to the containers can be avoided or at least considerably reduced.

The transport device 1 is mechanically robust as a result of the provision and nature of the base chain 10, which forms a stable, smooth-running base for the toggle lever mechanism 20. Durability, resistance and reliability are improved. This applies equally to the hygiene and ability to be cleaned, which are imperative in particular in the food processing sector.

The transport device 1 and the device 100 are particularly suitable for handling cans, comprising lightweight cans with a thin can wall.

If applicable, all the individual features which are presented in the exemplary embodiments can be combined and/or interchanged with one another without departing from the scope of the invention.

What is claimed is:

1. A transport device for transporting containers along a transport path, comprising:
   a base chain comprising a plurality of chain links that are lined up in a row along the transport path and are connected to one another in a correspondingly pivotable manner via chain joints, wherein the plurality of chain links are at least partly displaceable relative to one another in a direction of the transport path so that a distance between adjacent chain joints is variable;
   a plurality of container carriers that provided on at least some of the plurality of chain links and configured to receive a respective container and to carry the respective container along the transport path;
   a chain track that is configured to guide the base chain along the transport path; and
   a toggle lever mechanism that is attached to the base chain and configured to displace the plurality of chain links relative to one another in cooperation with the chain track.

2. The transport device of claim 1, wherein the base chain further comprises transport rollers or sliding surfaces that are configured to roll or slide on the chain track and to guide the base chain along the transport path.

3. The transport device of claim 1, wherein a portion of the plurality of chain links each comprise a slot in which a corresponding chain joint for an articulated connection to an adjacent chain link is displaceably mounted.

4. The transport device of claim 3, wherein the plurality of chain links comprise two types of chain links.

5. The transport device of claim 4, wherein the two types of chain links comprise strain relief links and carrier links, and the strain relief links and the carrier links are lined up alternatively in a row via corresponding chain joints.

6. The transport device of claim 5, wherein the carrier links each comprise a container carrier and the strain relief links each comprise a slot in which the corresponding chain joint for the articulated connection to an adjacent carrier link is displaceably mounted.

7. The transport device of claim 1, wherein the toggle lever mechanism comprises a plurality of toggle lever assemblies each having two spacing levers, and the two spacing levers are each pivotably connected to one another in an end section via a spacer lever joint and are correspondingly pivotably installed on the base chain in the other end sections.

8. The transport device of claim 7, further comprising a spacing roller that rolls on the chain track and is installed on the spacer lever joint, as a result of which a shape of the chain track determines a spreading of the toggle lever mechanism and a displacement of the plurality of chain links relative to one another.

9. The transport device of claim 1, wherein the chain track comprises a lower running contour and an upper running contour, and transport rollers or sliding surfaces are configured to roll on the lower running contour and spacing rollers are configured to roll on the upper running contour.

10. The transport device of claim 1, further comprising two rotatable deflection wheels, around which the base chain is laid as a closed chain and which are configured to cause the base chain to circulate, as a result of which the base chain is transported along the transport path.

11. The transport device of claim 10, wherein the two rotatable deflection wheels are formed as gearwheels and configured to engage in point-by-point in corresponding recesses in the base chain so that a torque provided by one or two of the two rotatable deflection wheels is transmitted to the base chain.

12. The transport device of claim 1, wherein the base chain forms a chain strand, and the transport device comprises two chain strands that run parallel to each other and at a distance from each other.

13. The transport device of claim 12, wherein the toggle lever mechanism is attached to only one of the two chain strands.

14. A device for transporting and handling containers, comprising:
   one or more handling devices configured to handle the containers; and
   a transport device configured to transport the containers along a transport path, comprising:
      a base chain comprising a plurality of chain links that are lined up in a row along the transport path and are connected to one another in a correspondingly pivotable manner via chain joints, wherein the plurality of chain links are at least partly displaceable relative to one another in a direction of the transport path so that a distance between adjacent chain joints is variable;
      a plurality of container carriers that provided on at least some of the plurality of chain links and configured to receive a respective container and to carry the respective container along the transport path;
      a chain track that is configured to guide the base chain along the transport path; and
      a toggle lever mechanism that is attached to the base chain and configured to displace the plurality of chain links relative to one another in cooperation with the chain track.

15. The device of claim 14, wherein the one or more handling devices comprises:
   a filling device configured to fill the containers with a filling product; and
   a closing device configured to close each of the containers filled with the filling product with a closure,
   wherein the transport device is further configured to transport the containers filled with the filling product from the filling device to the closing device.

16. The device of claim 15, wherein the filling device and the closing device are each further configured to handle containers with a different spacing, and the transport device is further configured to accept the containers from the filling device with a first spacing, to move the containers to a second spacing suitable for the closing device during transport to the closing device, and to transfer the containers to the closing device.

17. The device of claim 16, wherein a spacing of the filling device is smaller than a spacing of the closing device.

18. The device of claim 15, wherein the chain track provides at least three zones of chain spacing:
   a first zone configured to move the base chain to a spacing required for receiving the containers from the filling device,
   a second zone where a transfer of the containers from the filling device to the transport device takes place, and
   a third zone that is configured to adapt a spacing of the containers for the closing device, wherein a distance between the plurality of chain links is enlarged in the third zone compared to a distance between the plurality of chain links in the first zone.

19. The device of claim 15, wherein the filling device comprises a rotary-type device that is configured to transport the containers along a curved trajectory during filling and/or the closing device comprises a rotary-type device that is configured to transport the containers along a curved trajectory during closing of the containers.

20. The device of claim 14, wherein the containers comprise cans.

\* \* \* \* \*